United States Patent Office 3,591,361
Patented July 6, 1971

3,591,361
HERBICIDAL MULCHING FILMS
Shoichi Ishimoto, Chiba-ken, Japan, assignor to Mitsubishi Petrochemical Co., Ltd., Tokyo, and Mikado Seed Growers Co., Ltd, Chiba-shi, Chiba-ken, Japan
No Drawing. Filed Dec. 23, 1968, Ser. No. 786,408
Claims priority, application Japan, Dec. 28, 1967, 43/83,784
Int. Cl. A01n 9/22
U.S. Cl. 71—93                3 Claims

ABSTRACT OF THE DISCLOSURE

A herbicidal mulching film comprising a polyolefin film containing a herbicide of a member selected from the group consisting of 3-(3,4-dichlorophenyl) - 1,1 - dimethylurea and 2-methylthio-4,6-bisisopropylamino-S-triazine.

BACKGROUND OF THE INVENTION

Field of the invention

This invention relates to a herbicidal mulching film, i.e. a film containing a heribicide for covering planted grounds.

Description of the prior art

It is known to foster the growth of farm products by covering ground between roots of farm plants with a polyolefin film for raising the ground temperature. However, when the ground is merely covered by a transparent polyolefin film, the growth of farm plants may be fostered by the raised ground temperature to be sure, but the growth of weeds is fostered as well.

Thus, even if the fostering of growth of farm plants is attempted by using such a mulching film, significant effect in terms of yields of farm products is spoiled by disadvantageous overgrowth of weeds. Hence, as a countermeasure, herbicides are scattered over planted ground for preventing growth or overgrowth of weeds prior to covering the planted ground with a mulching film.

However, not only it is inconvenient to carry out the weeding work separately but also when a certain type of herbicide is used, at times, the weeding effect is not necessarily satisfactory.

In view of these inconveniences as described above, there has been proposed a method in which paper or cloth is coated with a solution of herbicides and the resulting paper or cloth having a herbicidal ability is used as a mulching film.

However, such mulching film has drawbacks not only in its poor permeability to sunlight and less effect in raising ground temperature but also in its poor weathering resistance and short durability.

Being provided with properties such as good transparency and high weathering resistance, polyolefin film is a preferable material for a mulching film. However, even if a herbicide is coated on polyolefin film by adopting the idea mentioned above, there would not be obtained a satisfactory result, because it is quite difficult to adhere the herbicide securely to the polyolefin film. As a result, the herbicide tends to be washed off or come off during the transportation or handling and the weeding effect thereof is rather unsatisfactory.

SUMMARY OF THE INVENTION

It is, therefore, an object of this invention to provide a mulching film having an excellent herbicidal ability.

To wit, this invention is directed to accomplishing two objects, i.e. fostering the growth of contemplated farm plants and killing the weeds, by the use of a polyolefin film containing a specific herbicide.

It has now been found that these objects mentioned above can be accomplished by using a polyolefin film containing a herbicide selected from the group consisting of 3-(3,4-dichlorophenyl)-1,1-dimethylurea and 2 - methylthio-4,6-bisisopropylamino-S-triazine, as a mulching film.

As described above, the herbicidal mulching film of this invention comprises a polyolefin film into which is incorporated a specific herbicidal composition.

The features of the herbicidal mulching film reside in that the washing off or coming off of the herbicidal composition is completely prevented and that there can be obtained better weeding effect than that of conventional mulching film in which herbicidal composition is deposited on the surface thereof.

The concentration of herbicide on the mulching film of this invention in which a herbicidal composition is kneaded into polyolefin film is considerably lower than that of conventional mulching film in which herbicidal composition is deposited on the surface thereof. Thus, at a glance, the herbicidal mulching film of this invention may appear as being incapable of affording a satisfactory weeding effect.

It is quite unexpected that the herbicidal mulching film of this invention nevertheless shows an excellent herbicidal ability as demonstrated in the examples described hereinafter for a prolonged period of time.

It is presumed that the advantageous effect brought about by the herbicidal mulching film of this invention stems from the migration and bleeding of the herbicidal composition incorporated therewith to the surface of the film at a suitable speed with the lapse of time.

As described above, the herbicidal mulching film of this invention contains a specific herbicide, i.e. 3-(3,4-dichlorophenyl)-1,1-dimethylurea or 2-methylthio-4,6-bisisopropylamino-S-triazine.

The present inventor has conducted a series of experiments with regard to herbicidal mulching films into which are incorporated various herbicidal compositions to evaluate the weeding effect, respectively. As a result, it has been found that those two types of herbicide referred to above are most preferable.

More particularly, these two types of herbicide are superior to other herbicides in that they have suitable speeds of migrating and bleeding to the surface of the film; that they have herbicidal capabilities for a prolonged period of time; that they are sufficiently effective even when used in small amounts; that they are successfully blended with polyolefins and the resulting mixtures are easily shaped into films; and that they are not thermally decomposed at the time of blending with polyolefins.

In contrast, some other types of herbicides are required to be incorporated in greater quantity into polyolefins in order to obtain a sufficient weeding effect and, in addition, these herbicides have unsatisfactory compatibilities with polyolefins and inadequate speeds of migration and bleeding. As a result, there are caused drawbacks in that the uniform blending and subsequent shaping into film become difficult; that the resulting film, when it is piled up or folded, tends to be difficultly separated due to blocking thereof and that there is caused a corrosion of the material of the blender due to use of large amounts of herbicides. In addition, the use of other types of herbicides causes inconveniences such as chemical damages to the farm plants and increased cost of the film, because they are required in large amounts.

The concentration of the herbicidal composition in the mulching film of this invention may be optionally chosen within the range allowed by the compatibility of polyolefin resin therewith.

Although the concentration of the herbicide in the polyolefin film depends upon the thickness of the film, in general, the concentration of less than 0.25% by weight based on the total weight of the resulting film is insufficient for a satisfactory weeding effect, while that exceeding 0.64% by weight on the same basis is undesirable since it leads to chemical damage to some farm plants, e.g. radishes, which are susceptible to chemicals.

Polyolefins which may be used for the herbicidal mulching film of this invention include homopolymers of ethylene or propylene, and copolymers mainly comprised of ethylene or propylene. The film may either be transparent or colored.

The polyolefins imparted herbicidal properties by incorporating a herbicide thereinto are shaped into a film having a thickness of, e.g., 0.01–0.1 mm.

The herbicidal mulching film of this invention may be employed according to the manner in which conventional mulching films are employed. To wit, the film may be spread over ridges in a field between roots of the farm plants, or, spread over the entire ridges with prior provision of holes in the film through which seeds may be sowed.

By the provision of the herbicidal mulching film of this invention on the planted ground, the evaporation of water in the soil is prevented thus raising the ground temperature and the loss of fertilizers due to flowing out thereof can also be prevented while the herbicide in the film migrates and bleeds to the surface thereof with subsequent migration into the soil thus affording an excellent weeding effect for a prolonged period of time.

In general, the herbicidal mulching film of this invention is adapted to cover the ground for about 60–70 days and the weeding effect lasts throughout the period mentioned above, especially, the effect afforded during about 50 days being particularly remarkable.

The herbicidal mulching film of this invention may be effectively and successfully used for cultivating rice plants, corn, sugar cane, soy beans, peanuts, peas, French beans, radishes, lettuce, cabbages, onions, etc.

DESCRIPTION OF THE PREFERRED EMBODIMENTS

The following examples will serve to illustrate this invention more fully and practically. It should not be construed however, that these examples restrict this invention in any way.

Example 1

Into a conventional low density polyethylene was incorporated 1.91% by weight based on the total weight of a herbicide "Karmex-D," a product of E. I. du Pont, U.S.A., containing 78.5% by weight of 3-(3,4-dichlorophenyl)-1,1-dimethylurea as an active ingredient, and the resulting mixture was kneaded in a Banbury mixer to give a master batch containing 1.5% by weight of said active ingredient.

The master batch thus obtained was compounded with the polyethylene mentioned above in various proportions so that 0.64, 0.52, 0.39, and 0.26 percent by weight of the herbicidal component may be contained therein, and the resulting mixtures were shaped into a film of 90 cm. width and 0.017 mm. thickness, respectively.

Separately, with the same polyethylene as mentioned above were incorporated 3% by weight of a herbicide "Gesagard-50," sold by Nihon Agricultural Chemicals Co., Ltd., Japan, containing 50% by weight of 2-methylthio-4,6-bisisopropylamino-S-triazine as an active ingredient to prepare a master batch containing 1.5% by weight of the herbicidal component. There were obtained herbicidal films by following the same procedures as described above.

On the other hand, the herbicides "Karmex-D" and "Gesagard-50" were, respectively, mixed with a 20% by weight methanol solution of polyethyleneimine in various concentrations and the resulting mixtures were extensively coated, respectively, on a polyethylene film having a width of 90 cm. and a thickness of 0.017 mm. by means of a gravure roll so that 0.64, 0.52, 0.39 and 0.26 percent by weight of the herbicidal components based on the dried weight were attached to the film, respectively.

The resulting film was provided with planting holes, each having a diameter of 3.5 cm., which were 20 cm. off from the centerline of the film and spaced apart from each other by 15 cm.

The film was spread over a ridge of a farm field and seeds of an upland rice plant were sowed through the planting holes to examine the weeding effect.

The results of weeding effect performed with respect to respective mulching films after 30 days from the sowing were as shown in the following Table 1.

TABLE 1

| Concentration of herbicide (percent by weight) | Growth of weeds* | | | |
|---|---|---|---|---|
| | Mulching film of this invention | | Herbicide coated mulching film | |
| | Karmex | Gesagard | Karmex | Gesagard |
| 0.64 | — | — | ± | ± |
| 0.52 | — | — | ++ | + |
| 0.39 | + | — | ++ | ++ |
| 0.26 | ++ | + | +++ | +++ |

*Basis of evaluation:
 — No weeds.
 ± Minimal.
 + Growth of weeds less than 30% of ground where no herbicidal mulching film was used.
 ++ Growth of weeds 30–60% of ground where no herbicidal mulching film was used.
 +++ Growth of weeds more than 80% of ground where no herbicidal mulching film was used.

As is clearly shown in the Table 1, the mulching film of this invention is superior to those on which herbicides were deposited.

Example 2

With a conventional low density polyethylene were incorporated herbicides, "Gesagard-50"; "Karmex-D"; "NIP Emulsion," a product of Nihon Agricultural Chemicals Co., Ltd., Japan, containing 2,4-dichlorophenyl-4-nitrophenyl ether as an active ingredient; and "Stam Emulsion," a product of Nihon Agricultural Chemicals Co., Ltd., Japan, containing 3,4-dichloropropion anilide as an active ingredient, respectively, to give master batches, each containing 1.5% by weight of respective herbicidal component.

The resulting master batch was kneaded with the above-mentioned polyethylene, respectively, so that the active concentration may be as shown in the following Table 2, then, mulching films were prepared therefrom according to the same procedures as described in Example 1.

The results of test on the weeding effect performed with regard to these mulching films were tabulated in the Table 2.

TABLE 2

| Type of herbicide | Active herbicidal [1] component (percent by weight) | Growth of weeds [2] |
|---|---|---|
| Gesagard | 0.64 | — |
| | 0.52 | — |
| | 0.39 | — |
| | 0.26 | + |
| Karmex | 0.48 | — |
| | 0.39 | — |
| | 0.29 | + |
| | 0.19 | ++ |
| NIP | 1.6 | + |
| | 1.3 | ++ |
| | 0.96 | ++ |
| | 0.64 | +++ |
| STAM | 1.6 | ++ |
| | 1.3 | +++ |
| | 0.96 | +++ |
| | 0.64 | +++ |

[1] With regard to "Gesagard" and "Karmex," percent by weight of active herbicidal component based on the total weight of film and herbicide. As for "NIP" and "STAM," percent by weight of dried residue thereof based on the total weight of film and herbicide.
[2] See footnote, Table 1, for explanation of symbols.

From the results shown above, it is clear that the herbicides used in this invention are effective with the small amounts.

Example 3

Various types and amounts of herbicides as specified in the following Table 3 were incorporated into a low density polyethylene film of 0.017 mm. thickness, respectively. With regard to these various mulching films thus prepared, the growth of various harmful weeds in terms of weight per m.$^2$ after 20 days from sowing of upland rice plant seeds was measured.

The results are tabulated in the following Table 3.

TABLE 3

| Example No. | Type of herbicide [1] | Amount of active herbicidal component incorporated [2] | Weight of weeds (g./m.²) | Ratio [3] |
|---|---|---|---|---|
| Blank* | | | 7.385 | 100 |
| 1 | A | 1.5 | 0.716 | 9.7 |
| 2 | A | 2.0 | 0.510 | 6.9 |
| 3 | B | 0.64 | 2.356 | 31.9 |
| 4 | B | 0.96 | 2.164 | 29.3 |
| 5 | C | 0.25 | 0.739 | 10.0 |
| 6 | C | 0.36 | 0.569 | 7.7 |
| 7 | D | 0.39 | 0.377 | 5.1 |
| 8 | D | 0.52 | 0.273 | 3.7 |

[1] Symbols indicate the following herbicides:
A—Methyl-N-(3,4-dichlorophenyl) carbamate.
B—Isopropyl-N-(3-chlorophenyl) carbamate.
C—3-(3,4-dichlorophenyl)-1,1-dimethylurea.
D—2-methylthio-4,6-bisisopropylamino-S-triazine.
[2] Percent by weight based on the total weight of film and herbicide.
[3] The weight of weeds is indexed on the basis when the weight of weeds for "blank" is determined as 100.
*Polyethylene film containing no herbicide was used.

From the results shown above, it is clear that an excellent weeding effect is manifested with the herbicides used in this invention by incorporating quite small amounts thereof into the polyethylene film.

I claim:

1. A herbicidal mulching film consisting essentially of a polymer selected from the group consisting of polyethylene and ethylene copolymers, said film having a thickness of about 0.01–0.1 mm., and a herbicide selected from the group consisting of 3-(3,4-dichlorophenyl)-1,1-dimethylurea and 2-methylthio-4,6-bisisopropylamino-S-triazine dispersed in said film, the amount of said herbicide being about 0.25–0.64% by weight based on the total weight of the film and herbicide.

2. A herbicidal mulching film according to claim 1, wherein said polymer is polyethylene.

3. A herbicidal mulching film according to claim 2, wherein said polyethylene is low density polyethylene.

References Cited

UNITED STATES PATENTS

| 2,951,753 | 9/1960 | Groves | 71—1 |
| 3,212,967 | 10/1965 | McFadden et al. | 424—78 |
| 3,248,288 | 4/1966 | Wilder et al. | 424—83 |
| 3,341,318 | 9/1967 | Chilton | 71—96 |
| 3,343,941 | 9/1967 | Baltazzi | 71—85 |

FOREIGN REFERENCES

| 898,915 | 6/1962 | Great Britain | 71—92 |

ELBERT L. ROBERTS, Primary Examiner

G. HOLLRAH, Assistant Examiner

U.S. Cl. X.R.

71—111, 118, 120, 124